US012592798B2

(12) United States Patent
Zheng et al.

(10) Patent No.: US 12,592,798 B2
(45) Date of Patent: Mar. 31, 2026

(54) COMMUNICATION METHOD AND COMMUNICATIONS APPARATUS

(71) Applicant: Huawei Technologies Co., Ltd., Shenzhen (CN)

(72) Inventors: Lili Zheng, Shanghai (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 17/660,561

(22) Filed: Apr. 25, 2022

(65) Prior Publication Data

US 2022/0255696 A1     Aug. 11, 2022

Related U.S. Application Data

(63) Continuation of application No. PCT/CN2019/113498, filed on Oct. 26, 2019.

(51) Int. Cl.
   *H04W 56/00*     (2009.01)
   *H04L 5/00*     (2006.01)
(52) U.S. Cl.
   CPC ......... *H04L 5/0048* (2013.01); *H04W 56/001* (2013.01)
(58) Field of Classification Search
   CPC ........ H04L 5/0048; H04L 5/00; H04W 24/10; H04W 56/001
   See application file for complete search history.

(56) References Cited

U.S. PATENT DOCUMENTS

| | | | | |
|---|---|---|---|---|
| 2018/0337757 A1* | 11/2018 | Noh | ......................... | H04L 27/26 |
| 2018/0368088 A1* | 12/2018 | Nagaraja | ............. | H04W 56/001 |
| 2019/0182716 A1* | 6/2019 | Futaki | .................... | H04W 72/23 |
| 2019/0327696 A1 | 10/2019 | Oh et al. | | |
| 2019/0379431 A1* | 12/2019 | Park | ..................... | H04B 7/0408 |

(Continued)

FOREIGN PATENT DOCUMENTS

| | | | | | |
|---|---|---|---|---|---|
| CN | 108809574 A | * | 11/2018 | ........... | H04B 7/0626 |
| CN | 109076478 A | | 12/2018 | | |

(Continued)

OTHER PUBLICATIONS

CATT, "Offline summary on AI 7.2.4.1.3 Synchronization mechanism", 3GPP TSG RAN1 Meeting #95, R1-1814147, Spokane, NV, US, Nov. 12-16, 2018, 20 pages.

(Continued)

*Primary Examiner* — Derrick W Ferris
*Assistant Examiner* — On Jun Choi
(74) *Attorney, Agent, or Firm* — Slater Matsil, LLP

(57)     ABSTRACT

A second network device receives, from a first network device, configuration information corresponding to at least one first reference signal and configuration information corresponding to at least one synchronization signal block, where the at least one synchronization signal block is at least one synchronization signal block corresponding to a synchronization signal block frequency; and the second network device determines timing information of the at least one first reference signal based on timing information of a reference synchronization signal block, where the reference synchronization signal block belongs to the at least one synchronization signal block.

20 Claims, 5 Drawing Sheets

(56)                References Cited

U.S. PATENT DOCUMENTS

| | | | | |
|---|---|---|---|---|
| 2020/0053724 | A1* | 2/2020 | MolavianJazi | H04W 72/56 |
| 2020/0274679 | A1* | 8/2020 | Futaki | H04W 76/18 |
| 2020/0374871 | A1* | 11/2020 | Liu | H04L 5/0023 |
| 2021/0144658 | A1* | 5/2021 | Han | H04W 36/0069 |

FOREIGN PATENT DOCUMENTS

| | | |
|---|---|---|
| CN | 109155728 A | 1/2019 |
| WO | 2017171521 A1 | 10/2017 |

OTHER PUBLICATIONS

3GPP TS 38.331 V15.7.0 (Sep. 2019), 3rd Generation Partnership Project; Technical Specification Group Radio Access Network; NR; Radio Resource Control (RRC) protocol specification (Release 15), 527 pages.
3GPP TS 38.423 V15.5.0 (Sep. 2019), 3rd Generation Partnership Project; Technical Specification Group Radio Access Network; NG-RAN; Xn application protocol (XnAP) (Release 15), 311 pages.
3GPP TS 38.473, 15.7.0 (Sep. 2019), 3rd Generation Partnership Project; Technical Specification Group Radio Access Network; NG-RAN; F1 application protocol (F1AP) (Release 15), 221 pages.

* cited by examiner

100

600

70

COMMUNICATION METHOD AND COMMUNICATIONS APPARATUS

CROSS-REFERENCE TO RELATED APPLICATIONS

This application is a continuation of International Application No. PCT/CN2019/113498, filed on Oct. 26, 2019, the disclosure of which is hereby incorporated by reference in its entirety.

TECHNICAL FIELD

This application relates to the communications field, and in particular, to a communication method and a communications apparatus.

BACKGROUND

A 5G system may support measurement based on two types of signals: a synchronization signal/physical broadcast channel block (SS/PBCH Block, SSB) and a channel state information-reference signal (CSI-RS).

The SSB may include a primary synchronization signal (PSS), a secondary synchronization signal (SSS), a physical broadcast channel (PBCH), and a PBCH demodulation reference signal (DMRS) required for demodulating the PBCH. The PSS and the SSS may be used by a terminal device to perform downlink synchronization, for example, may include clock synchronization, frame synchronization, and symbol synchronization.

Currently, information related to the SSB and the CSI-RS may be exchanged between network devices. However, how a network device at a receive end determines an accurate time domain position of a CSI-RS resource is an urgent problem to be resolved.

SUMMARY

In view of this, embodiments of this application provide a communication method and a communications apparatus. This application provides a communication method and a communications apparatus, so that a receive end can accurately determine a time domain position of a reference signal (for example, a CSI-RS), and further effectively configure, on an air interface, a terminal device served by the receive end to perform measurement.

The embodiments of this application provide a communication method and a communications apparatus. Timing information of a reference synchronization signal block is used to determine timing information of a first reference signal, so that the receive end can accurately determine a time domain position of the first reference signal.

According to a first aspect, a communication method is provided. The communication method may be performed by a second network device, or may be performed by a chip or a circuit disposed in a second network device. This is not limited in this embodiment of this application.

For example, the communication method is performed by the second network device, and the communication method may include:

The second network device receives, from a first network device, configuration information corresponding to at least one first reference signal and configuration information corresponding to at least one synchronization signal block, where the at least one synchronization signal block is at least one synchronization signal block corresponding to a synchronization signal block frequency; and the second network device determines timing information of the first reference signal based on timing information of a reference synchronization signal block.

It may be understood that the reference synchronization signal block is one of the at least one synchronization signal block.

According to the communication method provided in this embodiment of this application, the second network device can accurately learn of, based on the timing information of the reference synchronization signal block, a time domain occurrence time of the first reference signal (for example, a CSI-RS), thereby improving communication efficiency. Further, the second network device can accurately and effectively configure, on an air interface, user equipment to perform CSI-RS measurement, thereby improving measurement accuracy. This is a basis of terminal device mobility (including cell reselection and handover).

In some implementations of the first aspect, the second network device learns, through protocol specification or preconfiguration, that an $X^{th}$ SSB or an SSB corresponding to a fixed frequency is used as the reference SSB, where X indicates a fixed sequence number in the at least one synchronization signal block, for example, which one of the at least one SSB numbered in sequence is the reference SSB.

In some implementations of the first aspect, the second network device may determine the reference synchronization signal block based on first indication information sent by the first network device, where the first indication information indicates frequency information corresponding to the reference synchronization signal block or an identifier corresponding to the reference synchronization signal block.

In some implementations of the first aspect, the second network device may determine the reference synchronization signal block based on second indication information sent by the first network device, where the second indication information is used to determine a synchronization status of each of the at least one synchronization signal block. For example, when it is determined, based on the second indication information, that all of the at least one synchronization signal block are synchronized, the second network device may determine that the reference synchronization signal block is any one of the at least one synchronization signal block. For another example, when it is determined, based on the second indication information, that not all of the at least one synchronization signal block are synchronized, the second network device determines that the reference synchronization signal block is a synchronization signal block corresponding to the fixed frequency or a synchronization signal block that is in the at least one synchronization signal block and that is corresponding to the fixed sequence number.

The first indication information and the second indication information may be classified as information used to indicate the reference synchronization signal block.

In some implementations of the first aspect, when receiving configuration information of SSBs corresponding to a plurality of frequencies, the second network device may consider, by default based on a specification, that the plurality of SSBs are synchronized, and may determine, as the reference SSB, any SSB or a synchronization signal block corresponding to a fixed frequency or a fixed sequence number.

In some implementations of the first aspect, the second network device may further receive, from the first network device, information about an SSB index, so that timing information of the CSI-RS is determined by using a timing of an SSB corresponding to the SSB index as a reference, where the SSB corresponding to the SSB index is used as the reference SSB. The information about the SSB index and the configuration information corresponding to the at least one first reference signal or the configuration information corresponding to the at least one synchronization signal block may be carried in a same message or in different messages.

In the foregoing implementation, the second network device can clearly learn that a specific synchronization signal block in the at least one synchronization signal block is used as the reference synchronization signal block, so that subsequent processing can be performed based on the reference synchronization signal block. For example, the second network device can accurately determine a time domain position of the reference signal (for example, a CSI-RS), and can further configure, on an air interface, a terminal device served by the second network device to perform measurement.

According to a second aspect, a communication method is provided. The communication method may be performed by a first network device, or may be performed by a chip or a circuit disposed in a first network device. This is not limited in this embodiment of this application.

For example, the communication method is performed by the first network device, and the communication method may include:

A first network device determines a reference synchronization signal block in at least one synchronization signal block, where the at least one synchronization signal block is at least one synchronization signal block corresponding to a synchronization signal block frequency; and the first network device sends, to a second network device, configuration information corresponding to at least one first reference signal and configuration information corresponding to the at least one synchronization signal block, where the configuration information corresponding to the at least one first reference signal is determined based on a timing of the reference synchronization signal block.

In some implementations of the second aspect, the first network device determines, through protocol specification or preconfiguration, that an $X^{th}$ SSB or an SSB corresponding to a fixed frequency is used as the reference SSB, where X indicates a fixed sequence number in the at least one synchronization signal block, for example, which one of the at least one SSB numbered in sequence is the reference SSB.

In some implementations of the second aspect, the first network device may determine the reference synchronization signal block based on a specific rule or requirement.

In some implementations of the second aspect, the first network device may send first indication information to the second network device, where the first indication information indicates frequency information corresponding to the reference synchronization signal block or an identifier corresponding to the reference synchronization signal block.

In some implementations of the second aspect, the first network device may send second indication information to the second network device, where the second indication information is used to determine a synchronization status of each of the at least one synchronization signal block, so that the second network device can determine the reference synchronization signal block based on an indication of the synchronization status.

The first indication information and the second indication information may be classified as information used to indicate the reference synchronization signal block.

In some implementations of the second aspect, when there is configuration information of SSBs corresponding to a plurality of frequencies, it can be considered, by default, that the plurality of SSBs are synchronized, and any SSB or a synchronization signal block corresponding to a fixed frequency or a fixed sequence number is determined as the reference SSB.

In some implementations of the second aspect, the first network device may further send, to the second network device, information about an SSB index, so that timing information of a CSI-RS is determined by using a timing of an SSB corresponding to the SSB index as a reference, where the SSB corresponding to the SSB index is used as the reference SSB. The information about the SSB index and the configuration information corresponding to the at least one first reference signal or the configuration information corresponding to the at least one synchronization signal block may be carried in a same message or in different messages.

In some implementations of the first aspect or the second aspect, the configuration information corresponding to the at least one first reference signal and the configuration information corresponding to the at least one synchronization signal block may be carried in a same message or in different messages.

According to a third aspect, a communications apparatus is provided. The communications apparatus includes a module, a unit, or a component configured to implement the communication method according to the first aspect.

According to a fourth aspect, a communications apparatus is provided. The communications apparatus includes a module, a unit, or a component configured to implement the communication method according to the second aspect.

According to a fifth aspect, a computer-readable storage medium is provided. The computer-readable storage medium stores a computer program; and when the computer program is executed by a communications apparatus, the communications apparatus is enabled to implement the method according to any one of the first aspect and the possible implementations of the first aspect.

According to a sixth aspect, a computer-readable storage medium is provided. The computer-readable storage medium stores a computer program; and when the computer program is executed by a communications apparatus, the communications apparatus is enabled to implement the method according to any one of the second aspect and the possible implementations of the second aspect.

According to a seventh aspect, a computer program product including an instruction is provided. When the instruction is executed by a communications apparatus, the communications apparatus is enabled to implement the method according to any one of the first aspect and the possible implementations of the first aspect.

According to an eighth aspect, a computer program product including an instruction is provided. When the instruction is executed by a communications apparatus, the communications apparatus is enabled to implement the method according to any one of the second aspect and the possible implementations of the second aspect.

According to a ninth aspect, a communications system is provided. The communications system includes the communications apparatus described in the third aspect and the communications apparatus described in the fourth aspect. Optionally, the communications system may further include a terminal device. The terminal device interacts with the communications apparatus described in the third aspect, or interacts with the communications apparatus described in the fourth aspect.

DETAILED DESCRIPTION OF ILLUSTRATIVE EMBODIMENTS

Figure 1:
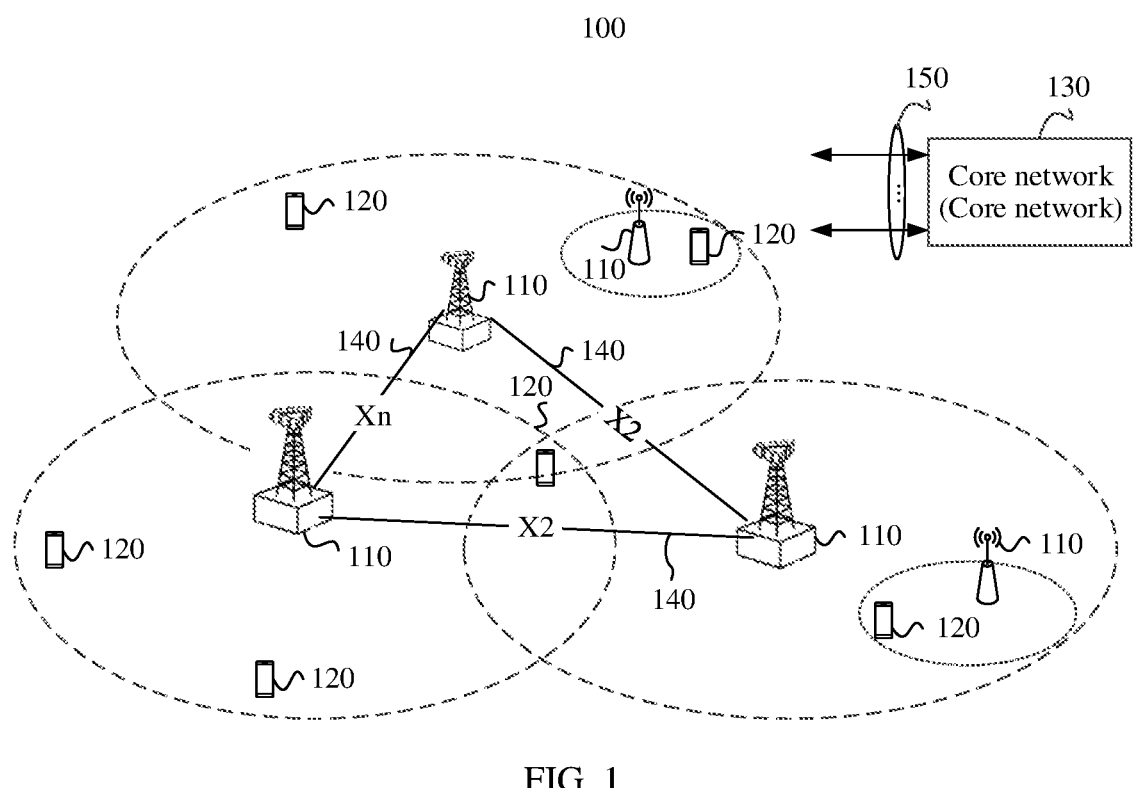
FIG. 1 is a schematic diagram of an application scenario according to an embodiment of this application.

The following describes the technical solutions of this application with reference to the accompanying drawings.

The technical solutions of embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) system, or a future network. A 5G mobile communications system in this application includes a non-standalone (NSA) 5G mobile communications system or a standalone (SA) 5G mobile communications system. The technical solutions provided in this application may be further applicable to future communications systems, for example, a sixth generation mobile communications system. Alternatively, the communications system may be a public land mobile network (PLMN), a device-to-device (D2D) communications system, a machine-to-machine (M2M) communications system, an internet of things (IoT) communications system, or another communications system.

A terminal device (terminal equipment) in the embodiments of this application may be an access terminal, a subscriber unit, a subscriber station, a mobile station, a mobile console, a relay station, a remote station, a remote terminal, a mobile device, a user terminal, user equipment (UE), a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), a terminal device in a future internet of things, or the like. This is not limited in the embodiments of this application.

By way of example, and not limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs In addition, the terminal device in the embodiments of this application may alternatively be a terminal device in an IoT system. IoT is an important part of future development of information technologies. A main technical feature of the IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (NB) technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and transmitting uplink data to a network device.

A network device in the embodiments of this application may be any communications device that has a wireless transceiver function and that is configured to communicate with a terminal device. The device includes but is not limited to an evolved NodeB (eNB), a radio network controller (RNC), a NodeB (NB), a base station controller (BSC), a base transceiver station (BTS), a home base station (home evolved NodeB, HeNB or home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system; may be an antenna panel or a group of antenna panels (including a plurality of antenna panels) of a base station in a 5G system; or may be a network node, such as a baseband unit (BBU) or a distributed unit (DU), that constitutes a gNB or a transmission point. The network device in the embodiments of this application may also be referred to as an access network device.

In some deployments, the network device in the embodiments of this application may be a central unit (CU) or a distributed unit (DU), or the network device includes a CU or a DU. The gNB may further include an active antenna unit (active antenna unit, AAU). The CU implements a part of functions of the gNB, and the DU implements a part of functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements a part of physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or may be classified as a network device in a core network (core network, CN). This is not limited in this application.

Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP-C layer. The PDCP-C layer is mainly responsible for data encryption and decryption, integrity protection, data transmission, and the like on a control plane. The CU-UP is responsible for a user plane function, and mainly includes an SDAP layer and a PDCP-U layer. The SDAP layer is mainly responsible for processing data of a core network and mapping a flow (flow) to a bearer. The PDCP-U layer is mainly responsible for at least one function of encryption and decryption, integrity protection, header compression, serial number maintenance, data transmission, and the like on a data plane. Specifically, the CU-CP and the CU-UP are connected through a communications interface (for example, an E1 interface). The CU-CP represents a network device and is connected to a core network device through a communications interface (for example, an NG interface), and is connected to the DU through a communications interface (for example, an F1-C (control plane) interface). The CU-UP is connected to the DU through a communications interface (for example, an F1-U (user plane) interface).

In another possible implementation, the PDCP-C layer is also included in the CU-UP.

It may be understood that the foregoing protocol layer division between the CU and the DU, and protocol layer division between the CU-CP and the CU-UP are merely examples, and there may be another division manner. This is not limited in the embodiments of this application.

The network device mentioned in the embodiments of this application may be a device including a CU or a DU, or a device including a CU and a DU, or a device including a control plane CU node (a CU-CP node), a user plane CU node (a CU-UP node), and a DU node.

The network device and the terminal device may be deployed on land, where the deployment includes indoor or outdoor, or handheld or vehicle-mounted deployment, may be deployed on water, or may be deployed on an aerocraft, a balloon, and a satellite in air. Scenarios in which the network device and the terminal device are located are not limited in the embodiment of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), or a memory (also referred to as a main memory). An operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software.

FIG. 1 is a schematic architectural diagram of a wireless communications system 100 that may be applicable to an embodiment of this application. As shown in FIG. 1, the wireless communications system 100 may include one or more network devices 110, one or more terminal devices 120, and a core network 130.

The network device 110 may be configured to communicate with one or more terminal devices 120, or may be configured to communicate with one or more base stations having a part of terminal device functions. Optionally, the network device 110 may be configured to, under control of a network device controller (not shown in FIG. 1), communicate with the terminal device 120 through one or more antennas. The network device controller may be a part of the core network 130, or may be integrated into the network device 110. Optionally, the network device 110 transmits control information or user data to the core network 130. Further, network devices 110 may also directly or indirectly communicate with each other.

In the embodiments of this application, the network devices may exchange related information of an SSB and related information of a CSI-RS with each other. For example, a first network device and a second network device may exchange the related information of the SSB and the related information of the CSI-RS with each other. Exchange between the first network device and the second network device may include that the first network device sends the related information of the SSB and the related information of the CSI-RS to the second network device, and may also include that the second network device sends the related information of the SSB and the related information of the CSI-RS to the first network device. For example, when the two network devices are base stations or CUs, the two network devices may exchange the related information of the SSB and the related information of the CSI-RS through an X2 or Xn interface; when the first network device is a DU and the second network device is a CU, or when the first network device is a CU and the second network device is a DU, the two network devices exchange the related information of the SSB and the related information of the CSI-RS through an F1 interface.

It should be noted that the SSB and the CSI-RS are sent by using one or more beams. A beam may be understood as a spatial resource, and may be a transmit or receive precoding vector having an energy transmission directivity. In addition, the transmit or receive precoding vector can be identified by using index information, and the index information may be a correspondingly configured resource identifier (identity, ID) of a terminal. For example, the index information may be a correspondingly configured identifier or resource of a CSI-RS, or may be a correspondingly configured identifier or resource of an SSB, or may be a correspondingly configured identifier or resource of an uplink sounding reference signal (SRS). Optionally, the index information may alternatively be explicitly or implicitly carried by a signal or a channel that is carried by a beam. The energy transmission directivity may mean that the precoding vector is used to perform precoding processing on a signal that needs to be sent, so that the signal obtained after the precoding processing has a specific spatial directivity, and that a received signal obtained after the precoding processing is performed by using the precoding vector has relatively good received power, for example, meets a received demodulation signal-to-noise ratio. The energy transmission directivity may also mean that same signals sent from different spatial positions and received by using the precoding vector have different received power.

Optionally, a same communications apparatus (for example, a terminal device or a network device) may have different precoding vectors, and different devices may also have different precoding vectors, that is, correspond to different beams. For a configuration or a capability of a communications apparatus, one communications apparatus may simultaneously use one or more of a plurality of different precoding vectors, that is, one or more beams may be simultaneously formed.

The related information of the SSB may include but is not limited to at least one of the following: frequency information (for example, carrierFreq) of the SSB, a subcarrier spacing (ssbSubcarrierSpacing) of the SSB, a measurement timing configuration (for example, ssb-MeasurementTimingConfiguration) of the SSB, or a physical cell identifier (physical cell ID, PCI) corresponding to the SSB. The related information of the SSB may also be referred to as configuration information of the SSB or resource information of the SSB, or may be referred to as configuration information corresponding to the SSB, or the like. This is not limited in the embodiments of this application.

The related information of the CSI-RS may include but is not limited to at least one of the following: an index of the CSI-RS, a subcarrier spacing of the CSI-RS, a periodicity and an offset of the CSI-RS, a frequency domain position occupied by the CSI-RS, or a scrambling sequence of a CSI-RS sequence. The related information of the CSI-RS may also be referred to as configuration information of the CSI-RS or resource information of the CSI-RS, or may be referred to as configuration information corresponding to the CSI-RS. This is not limited in the embodiments of this application. The offset and the periodicity may be used to determine a part of time domain information of the CSI-RS, for example, may be used to determine a specific subframe on which the CSI-RS starts in the time domain.

The inventor of this application finds that, because the CSI-RS does not have a synchronization function, if the related information of the CSI-RS is exchanged between the network devices, a network device serving as a receiver does not know an accurate time domain position of the CSI-RS after receiving the CSI-RS. Therefore, in some possible implementations of the embodiments of this application, the related information of the CSI-RS may further include information used to determine timing information of the CSI-RS. It may be understood that in some other implementations of the embodiments of this application, the information used to determine the timing information of the CSI-RS may not need to be exchanged between the network devices, for example, the timing information of the CSI-RS is determined through protocol specification, preconfiguration, or another manner. Different implementations are separately described in the following embodiments with reference to the accompanying drawings.

Figure 2:
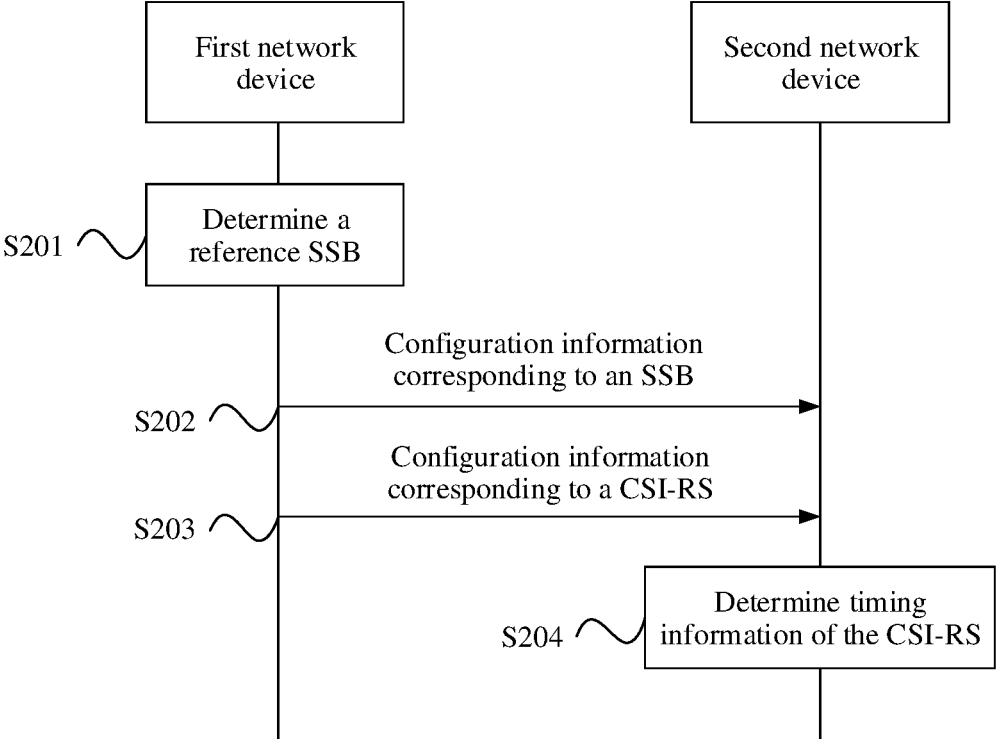
FIG. 2 is a schematic diagram of a communication method according to an embodiment of this application.

As shown in FIG. 2, an embodiment of this application provides a communication method. The method may include the following steps.

S201: A first network device determines a reference synchronization signal block SSB in at least one synchronization signal block.

In this embodiment, an $X^{th}$ SSB (to be specific, a synchronization signal block that is in the at least one synchronization signal block and that is corresponding to a fixed sequence number) may be configured as the reference SSB through protocol specification or preconfiguration, so that the first network device uses the $X^{th}$ SSB as the reference SSB. For example, it is assumed that the first network device is to send or has sent, to a second network device, configuration information of SSBs separately corresponding to a frequency 1, a frequency 2, and a frequency 3, and X is 1. In this case, the first network device determines the first SSB (that is, a synchronization signal block corresponding to the frequency 1) as the reference SSB. It may be understood that X may alternatively be another value. This is not limited in this embodiment of this application.

Alternatively, an SSB corresponding to a fixed frequency may be determined as the reference SSB through protocol specification or preconfiguration, so that the first network device uses the SSB corresponding to the fixed frequency as the reference SSB. For example, it is assumed that the first network device is to send or has sent, to a second network device, configuration information of SSBs separately corresponding to a frequency 1, a frequency 2, and a frequency 3, and the fixed frequency specified in a protocol or preconfigured is the frequency 2. In this case, the first network device determines an SSB corresponding to the frequency 2 as the reference SSB.

A possible implementation of the preconfiguration may be as follows: A core network device sends information about the reference synchronization signal block to the first network device and the second network device.

S202: The first network device sends configuration information corresponding to the at least one SSB to the second network device.

Correspondingly, the second network device receives the configuration information that is corresponding to the at least one SSB and that is sent by the first network device, and therefore, may perform corresponding processing, for example, perform related configuration for a terminal device served by the second network device. Subsequent processing performed by the second network device on the received configuration information corresponding to the at least one SSB is not limited in this embodiment of this application.

As described above, the configuration information corresponding to the SSB may also be referred to as configuration information of the SSB, related information of the SSB, or the like. Content of the configuration information corresponding to the SSB is not described herein again. It may be understood that the at least one SSB is separately corresponding to at least one frequency, and the at least one frequency may include at least one of a frequency corresponding to a cell managed by the first network device and a frequency corresponding to a neighboring cell (where the neighboring cell may be a cell managed by another network device) of the cell managed by the first network device.

The configuration information corresponding to the at least one SSB may be transmitted by using interaction information between the network devices. The interaction information may be, for example, measurement timing configuration (MeasurementTimingConfiguration) information. The MeasurementTimingConfiguration information may include, for example, the following information element structure:

```
MeasTimingList ::= SEQUENCE (SIZE (1..maxMeasFreqsMN)) OF MeasTiming
MeasTiming ::= SEQUENCE {
    frequencyAndTiming          SEQUENCE {
```

-continued

```
    carrierFreq                         ARFCN-ValueNR,
    ssbSubcarrierSpacing                  SubcarrierSpacing,
    ssb-MeasurementTimingConfiguration        SSB-MTC,
    ss-RSSI-Measurement                   SS-RSSI-Measurement OPTIONAL
    }                                     OPTIONAL,
. . . ,
    [[
    ssb-ToMeasure-v1540                   SSB-ToMeasure
    physCellId                         PhysCellId OPTIONAL
    ]]
}
```

MeasTimingList (measurement timing list) includes the configuration information corresponding to at least one SSB.

It may be understood that the foregoing information element structure is merely an example, and an information element structure, a message carrier, and the like for sending the configuration information corresponding to the at least one SSB are not limited in this embodiment of this application. In addition, the foregoing information element structure is for a purpose of illustration, and names of information in the information element structure are not described one by one in this embodiment of this application.

In addition, an execution sequence of S201 and S202 is not limited in this embodiment of this application. In other words, S202 may be performed before or after S201, or S201 and S202 may be simultaneously performed.

S203: The first network device sends configuration information corresponding to at least one CSI-RS to the second network device.

Herein, the CSI-RS is an example of a first reference signal. It may be understood that the first reference signal may alternatively be another reference signal. This is not limited in this embodiment of this application. In addition, in this embodiment of this application, the signal is not limited to a reference signal, and the signal may alternatively be another signal. Any signal that has a problem similar to that of the CSI-RS may be applicable to this embodiment of this application.

The second network device receives the configuration information that is corresponding to the at least one CSI-RS and that is sent by the first network device, and therefore, may perform corresponding processing, for example, perform related configuration for the terminal device served by the second network device. Subsequent processing performed by the second network device on the received configuration information corresponding to the at least one CSI-RS is not limited in this embodiment of this application.

As described above, the configuration information corresponding to the CSI-RS may also be referred to as configuration information of the CSI-RS, related information of the CSI-RS, or the like. Content of the configuration information corresponding to the CSI-RS is not described herein again. The configuration information corresponding to the at least one CSI-RS may include at least one of configuration information, of a CSI-RS, corresponding to a cell managed by the first network device and configuration information, of a CSI-RS, sent by a neighboring cell of the cell managed by the first network device.

The configuration information corresponding to the at least one CSI-RS may also be transmitted by using interaction information between the network devices. For example, the configuration information corresponding to the at least one CSI-RS may be sent by using a message that is the same as or different from a message used to send the configuration information corresponding to the at least one SSB.

When the configuration information corresponding to the at least one CSI-RS is sent by using a message that is the same as the message used to send the configuration information corresponding to the at least one SSB, in a possible implementation, the configuration information corresponding to the at least one CSI-RS may also be carried in MeasurementTimingConfiguration.

The configuration information of the at least one CSI-RS is determined based on timing information of the reference SSB. For example, an offset in the configuration information of the CSI-RS may be determined based on a timing of the reference SSB.

It should be noted that, "based on a timing of the reference SSB" may be understood as based on a timing of a cell corresponding to the reference SSB.

Correspondingly, that the configuration information of the at least one CSI-RS is determined based on the timing information of the reference SSB may also be that the configuration information of the at least one CSI-RS is determined based on timing information of the cell corresponding to the reference SSB. For example, a reference cell is determined based on a frequency of the reference SSB and cell identifier information, and a time domain position (for example, the offset mentioned above) of the CSI-RS is determined by using timing information (including, for example, a frame number and a subframe number) of the reference cell as a reference. The cell identifier information may include a physical cell identifier (physical cell id, PCI) and/or a cell global identifier (cell global id, CGI). The cell identifier information may be directly carried in a same message as the configuration information of the CSI-RS, for example, carried in a container and exchanged through an X2/Xn/F1 interface, or the cell identifier information may be carried in a message that is carried on an X2/Xn/F1 interface and that carries a container carrying the configuration information of the CSI-RS (that is, the cell identifier information is carried outside the container instead of inside the container). For example, a periodicity and the offset in the configuration information of the CSI-RS determine that the configuration information of the CSI-RS appears in an $N^{th}$ subframe of an $M^{th}$ frame. In this case, when the configuration information of the CSI-RS uses a first cell (the cell corresponding to the reference SSB) as the reference cell, the $N^{th}$ subframe of the $M^{th}$ frame refers to an $N^{th}$ subframe of an $M^{th}$ frame of the first cell.

An execution sequence of S202 and S203 is not limited in this embodiment of this application. In other words, S202 and S203 may be simultaneously performed, or S202 may be performed before or after S203.

S204: The second network device determines timing information of the at least one CSI-RS based on the timing information of the reference SSB.

Timing information of an SSB is timing information of a cell corresponding to the SSB, and the timing information may include, for example, but is not limited to, at least one of the following: a frame number, a subframe number, and frame boundary information.

The second network device learns, through protocol specification or preconfiguration, that the $X^{th}$ SSB or the SSB corresponding to the fixed frequency is the reference SSB, and therefore, determines the timing information of the at least one CSI-RS based on the timing information of the reference SSB.

After determining the timing information of the at least one CSI-RS based on the timing information of the reference SSB, the second network device may perform subsequent processing, for example, configure the terminal device served by the second network device to perform corresponding CSI-RS measurement.

It should be noted that, determining the timing information of the CSI-RS based on the timing information of the reference SSB may also be understood as determining the timing information of the CSI-RS based on the timing information of the cell corresponding to the reference SSB. For example, the time domain position of the reference signal CSI-RS is determined by referring to the timing information (including the frame number, the subframe number, and the like) of the cell. In other words, a subframe in which the reference signal CSI-RS appears in the cell may be determined based on a configuration of the reference signal CSI-RS.

In this embodiment of this application, the synchronization signal block corresponding to the fixed frequency or the synchronization signal block that is in the at least one synchronization signal block and that is corresponding to the fixed sequence number is used as the reference synchronization signal block through protocol specification or preconfiguration. This is a basis for determining the timing information of the at least one CSI-RS. Therefore, a time domain occurrence time of the CSI-RS can be accurately learned of and communication efficiency is improved. Further, the second network device can accurately and effectively configure, on an air interface, user equipment to perform CSI-RS measurement, thereby improving measurement accuracy. This is a basis of terminal device mobility (including cell reselection and handover, and the like).

Figure 3:
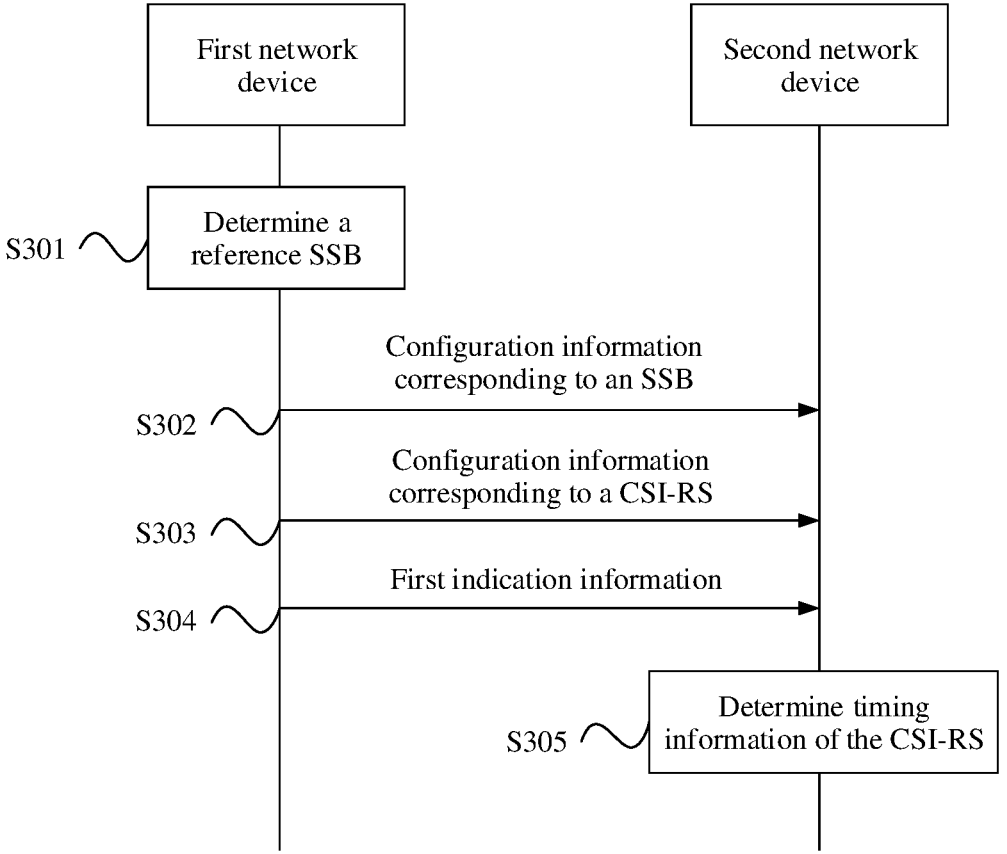
FIG. 3 is a schematic diagram of a communication method according to another embodiment of this application.

Another embodiment of this application provides a communication method. Different from the communication method shown in FIG. 2, in the communication method, the reference synchronization signal block may not be pre-agreed or preconfigured, but the second network device may determine the reference synchronization signal block based on an indication of the first network device. As shown in FIG. 3. The communication method may include the following steps.

S301: A first network device determines a reference synchronization signal block SSB in at least one synchronization signal block.

The first network device may determine the reference SSB in the at least one synchronization signal block based on a specific rule or requirement, or determine the reference SSB in the at least one synchronization signal block randomly. In a possible manner, the first network device may select a CD-SSB as the reference SSB. The CD-SSB is an SSB associated with remaining minimum system information (RMSI). The CD-SSB may also be understood as an SSB associated with an SIB 1. The CD-SSB may be used for camping, or may be used for primary cell configuration of a terminal device.

S302: The first network device sends configuration information corresponding to the at least one SSB to a second network device.

For specific descriptions of S302, refer to related descriptions of S202. Details are not described herein again.

S303: The first network device sends configuration information corresponding to at least one CSI-RS to the second network device.

For specific descriptions of S303, refer to related descriptions of S203. Details are not described herein again.

S304: The first network device sends first indication information to the second network device, where the first indication information is used by the second network device to determine the reference SSB.

Correspondingly, after receiving the first indication information, the second network device may determine the reference SSB.

The first indication information may indicate frequency information corresponding to the reference SSB or indicate an identifier (which may also be referred to as a sequence number) corresponding to the reference SSB.

In a possible implementation, that the first indication information indicates the frequency information corresponding to the reference SSB may be that the first indication information carries the frequency information corresponding to the reference SSB. For example, frequencies corresponding to the at least one SSB are separately a frequency 1, a frequency 2, and a frequency 3, and the first indication information may carry information about the frequency 2. In this case, the second network device may learn that the reference SSB is an SSB corresponding to the frequency 2.

In another possible manner, that the first indication information indicates the frequency information corresponding to the reference SSB may be that configuration information of each SSB correspondingly carries information used to indicate whether the SSB can be used as the reference SSB. In other words, configuration information of each frequency-level SSB indicates whether the SSB can be used as the reference SSB. For example, it is assumed that there are configuration information of an SSB corresponding to a frequency 1, configuration information of an SSB corresponding to a frequency 2, and configuration information of an SSB corresponding to a frequency 3. In this case, the configuration information of the SSB corresponding to the frequency 1 may indicate that the SSB can be used as the reference SSB, and configuration information of each of SSBs corresponding to the other two frequencies indicates that the SSB cannot be used as the reference SSB. In this case, the second network device may learn that the SSB corresponding to the frequency 1 is the reference SSB. A specific manner of indicating whether an SSB is used as the reference SSB is not limited in this embodiment of this application. For example, the indication is implemented by using information or a field of at least one bit. When the field is "1" or "TRUE", it indicates that the SSB is used as the reference SSB; when the field is "0" or "FALSE", it indicates that the SSB is not used as the reference SSB. Alternatively, corresponding indication information may only be carried in configuration information of the reference SSB, and when configuration information of an SSB that is not used as the reference SSB does not carry the related indication, it indicates by default that the SSB is not used as the reference SSB; or the configuration information of the SSB that is not used as the reference SSB may carry a related indication, but the configuration information of the reference SSB does not carry the related indication.

In a possible implementation, the identifier corresponding to the reference SSB may be a numerical identifier, indicating a specific SSB that is in the at least one SSB and that is used as the reference SSB. The identifier may start from 0, that is, an SSB corresponding to an identifier 0 is the first SSB, and so on. Alternatively, the identifier may start from 1, that is, an SSB corresponding to an identifier 1 is the first SSB, and so on. It may be understood that the identifier may alternatively start from another value, provided that the second network device can know a specific SSB that is in the at least one SSB and that is used as the reference SSB. This is not limited in this embodiment of this application.

It should be noted that the first indication information and the configuration information corresponding to the at least one SSB may be sent in a same message or in different messages, or the first indication information and the configuration information corresponding to the at least one CSI-RS may be sent in a same message or in different messages. In addition, S304 may be performed before, after, or at the same time as S302 or S303. This is not limited in this embodiment of this application.

S305: The second network device determines timing information of the at least one CSI-RS based on timing information of the reference SSB.

After receiving the first indication information, the second network device determines that the timing information of the at least one CSI-RS needs to be determined based on the timing information of the reference SSB. In this case, the second network device may determine the reference SSB based on an indication of the first indication information, and therefore, determine the timing information of the at least one CSI-RS based on the timing information of the reference SSB.

For specific descriptions of S305, further refer to related descriptions of S204. Details are not described herein again.

In this embodiment of this application, the first indication information is used to indicate the reference SSB. Therefore, the second network device can learn of the reference SSB used to determine a timing of the CSI-RS, so that a time domain occurrence time of the CSI-RS can be accurately learned of and communication efficiency is improved. Further, the second network device can accurately and effectively configure, on an air interface, user equipment to perform CSI-RS measurement, thereby improving measurement accuracy. This is a basis of terminal device mobility (including cell reselection and handover, and the like).

Figure 4:
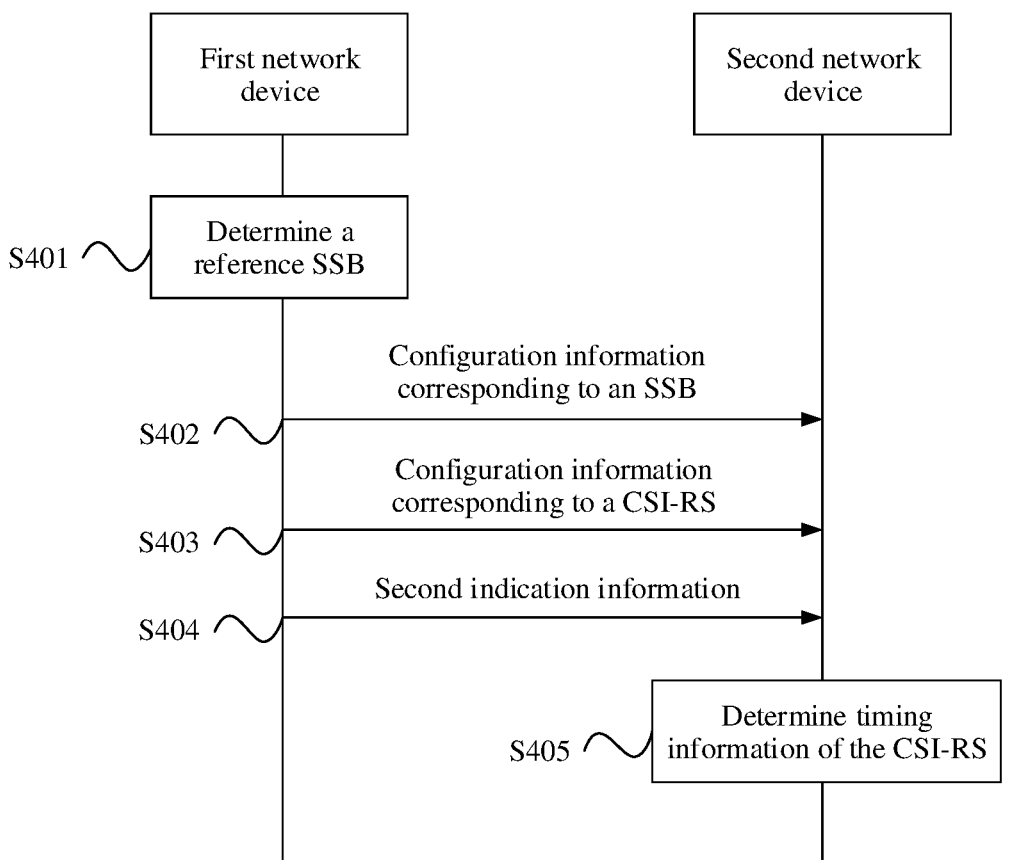
FIG. 4 is a schematic diagram of a communication method according to still another embodiment of this application.

Still another embodiment of this application further provides a communication method. Different from the embodiment shown in FIG. 3 in which the first indication information is used to indicate the reference SSB, in this embodiment, the second network device learns of the reference SSB by using an indication of a synchronization status of the at least one SSB. As shown in FIG. 4, the method may include the following steps.

S401: A first network device determines a reference synchronization signal block SSB in at least one synchronization signal block.

The first network device may determine the reference SSB in the at least one SSB based on a synchronization status of the at least one SSB. When all of the at least one SSB are synchronized, the first network device may determine any SSB as the reference SSB. Alternatively, when not all of the at least one SSB are synchronized, the first network device may determine, as the reference synchronization signal block, an SSB that is in the at least one SSB and that is corresponding to a fixed frequency or a fixed sequence number. That not all of the at least one SSB are synchronized may include: None of the at least one SSB is synchronized with another SSB, or one or more SSBs are not synchronized with another SSB.

Synchronization between SSBs indicates synchronization between cells corresponding to the SSBs. For example, it may be understood that synchronization between an SSB 1 and an SSB 2 indicates system frame number (SFN) synchronization and frame boundary synchronization between a cell 1 corresponding to the SSB 1 and a cell 2 corresponding to the SSB 2. The SFN synchronization may be understood as that SFNs are the same, and the frame boundary synchronization may be understood as that frame boundaries are aligned.

S402: The first network device sends configuration information corresponding to the at least one SSB to a second network device.

S403: The first network device sends configuration information corresponding to at least one CSI-RS to the second network device.

For specific descriptions of S402 and S403, respectively refer to related descriptions of S202 and S203. Details are not described herein again.

S404: The first network device sends second indication information to the second network device, where the second indication information is used by the second network device to determine the reference SSB.

In some possible implementations, the second indication information is used by the second network device to determine a synchronization status of each of the at least one synchronization signal block.

A specific manner of indicating the synchronization status is not limited in this embodiment of this application. For example, the indication may be implemented by using information or a field of at least one bit. When the field is "1" or "TRUE", it indicates that all of the at least one SSB are synchronized; when the field is "0" or "FALSE", it indicates that not all of the at least one SSB are synchronized. Alternatively, the second indication information may be sent only when all of the at least one SSB are synchronized, and when the second indication information is not sent, it indicates that not all of the at least one SSB are synchronized. Alternatively, the second indication information may be sent when not all of the at least one SSB are synchronized, and when all of the at least one SSB are synchronized, the second indication information is not sent. Therefore, the second network device can learn of the synchronization status of the at least one SSB, so as to determine the reference SSB.

It should be noted that the second indication information and the configuration information corresponding to the at least one SSB may be sent in a same message or in different messages, or the second indication information and the configuration information corresponding to the at least one CSI-RS may be sent in a same message or in different messages. In addition, S404 may be performed before, after, or at the same time as S402 or S403. This is not limited in this embodiment of this application.

S405: The second network device determines timing information of the at least one CSI-RS based on timing information of the reference SSB.

The second network device can learn of, based on the second indication information, the synchronization status of the at least one SSB, and therefore, determine the reference SSB. For example, similar to the first network device, the second network device may determine any SSB as the reference SSB when all of the at least one SSB are synchronized. Alternatively, when not all of the at least one SSB are synchronized, the second network device may determine, as the reference synchronization signal block, the SSB that is in the at least one SSB and that is corresponding to the fixed frequency or the fixed sequence number.

For specific descriptions of S405, further refer to related descriptions of S204. Details are not described herein again.

In this embodiment of this application, the second indication information is used to indicate related information used to determine the reference SSB. Therefore, the second network device can learn of the reference SSB used to determine a timing of the CSI-RS, so that a time domain occurrence time of the CSI-RS can be accurately learned of and communication efficiency is improved. Further, the second network device can accurately and effectively configure, on an air interface, user equipment to perform CSI-RS measurement, thereby improving measurement accuracy. This is a basis of terminal device mobility (including cell reselection and handover, and the like).

In addition, in another possible embodiment, when configuration information that is of at least one SSB and that is sent by a first network device to a second network device includes a plurality of SSB frequencies, it may be considered by default that a plurality of SSBs on the plurality of SSB frequencies are synchronized. Therefore, a procedure of the possible embodiment is similar to that of the embodiment shown in FIG. 4, and a difference lies in that a synchronization status of each SSB does not need to be determined and it is considered by default that the SSBs are synchronized. Therefore, S404 does not need to be performed, and the second network device may determine, as a reference SSB, any SSB in the plurality of SSBs or a synchronization signal block corresponding to a fixed frequency or a fixed sequence number. In this embodiment, it is specified in a protocol that when the configuration information that is of the at least one SSB and that is sent by the first network device to the second network device includes the plurality of SSB frequencies, the plurality of SSBs on the plurality of SSB frequencies are synchronized, and it is determined that a timing reference of a CSI-RS is an SSB on any SSB frequency, so that a time domain occurrence time of the CSI-RS can be accurately learned of and communication efficiency is improved. Further, the second network device can accurately and effectively configure, on an air interface, user equipment to perform CSI-RS measurement, thereby improving measurement accuracy. This is a basis of terminal device mobility (including cell reselection and handover, and the like).

That it is considered by default that the plurality of SSBs are synchronized may also be understood as: It is specified in the protocol that when the configuration information of the SSBs of the plurality of frequencies are sent, the plurality of SSBs are synchronized.

Optionally, on a basis of the foregoing method embodiments, the method may further include: The first network device sends, to the second network device, information about an SSB index, where the information about the SSB index may indicate to determine the timing information of the CSI-RS by using a timing of an SSB corresponding to the SSB index as a reference, where the SSB corresponding to the SSB index is used as the reference SSB. As described above, the reference SSB is an SSB corresponding to a frequency. There may be a plurality of SSBs that are corresponding to the frequency and whose transmit directions are different, and the plurality of SSBs may be identified by using indexes. In this case, the first network device sends the SSB index to the second network device, so that the second network device determines the timing information by using timing information of an SSB in a specific direction, where the SSB in the specific direction is used as the reference SSB. It may be understood that when the first network device does not send, to the second network device, the information about the SSB index, the second network device may determine the timing information of the CSI-RS by using timing information of an SSB in any direction, where the SSB in any direction is used as the reference SSB. In a possible manner, the information about the SSB index may be carried in an associated SSB (associatedSSB) field. Through indication of the SSB index, an SSB that is in a specific direction and that is used, as a reference, to obtain a timing of the CSI-RS may be further determined. Further, quasi-colocated information may be indicated based on the SSB index, to help a terminal device obtain information about a transmit direction of the CSI-RS more quickly and facilitate detection of the CSI-RS.

It may be understood that in the foregoing method embodiments of this application, a method implemented by the terminal device may alternatively be implemented by a component (for example, a chip or a circuit) that may be configured in the terminal device, a method implemented by the network device (the first network device or the second network device) may alternatively be implemented by a component (for example, a chip or a circuit) that may be configured in the network device, and a method implemented by the core network device may alternatively be implemented by a component configured in the core network device. In addition, the first network device may also be referred to as a first node, the second network device may also be referred to as a second node, and the core network device may also be referred to as a core network node.

It should be noted that in the foregoing embodiments of this application, "used to indicate" may include "used to directly indicate" and "used to indirectly indicate". When a piece of indication information is described as indicating A, the indication information may directly indicate A or indirectly indicate A, but it does not necessarily indicate that the indication information includes A.

Information indicated by the indication information is referred to as to-be-indicated information. In a specific implementation process, there are a plurality of manners of indicating the to-be-indicated information. For example, but not limited to, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is already known or pre-agreed. For example, specific information may also be indicated by using a pre-agreed (for example, specified in a protocol) arrangement sequence of various pieces of information, to reduce indication overheads to some extent. In addition, a common part of all pieces of information may be further identified and indicated in a unified manner, to reduce indication overheads caused by separately indicating same information.

In addition, "first", "second", and various numerical numbers in the embodiments of this application are merely used for distinguishing for ease of description, and are not used to limit a scope of the embodiments of this application. For example, different frequencies are distinguished.

In addition, the "protocol" involved in the embodiments of this application may be a standard protocol in the communications field, for example, may include an LTE protocol, an NR protocol, and a related protocol applied to a future communications system. This is not limited in this application.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the terminal device in the foregoing method embodiments, or an apparatus including the terminal device, or a component (a chip or a circuit) that may be used in the terminal device. Alternatively, the communications apparatus may be the network device (for example, the first network device and the second network device) in the foregoing method embodiments, or an apparatus including the network device, or a component that may be used in the network device. Alternatively, the communications apparatus may be the core network device in the foregoing method embodiments, or a component that may be used in the core network device. It can be understood that, to implement the foregoing functions, the communications apparatus includes a corresponding hardware structure and/or software module for performing the functions. With reference to units and algorithm steps of each example described in the embodiments disclosed in this specification, this application may be implemented in a form of hardware or a combination of hardware and computer software. A person skilled in the art may use different methods to implement the described functions for each particular application, but it should not be considered that the implementation goes beyond the scope of this application.

In the embodiments of this application, the communications apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module.

Figure 5:
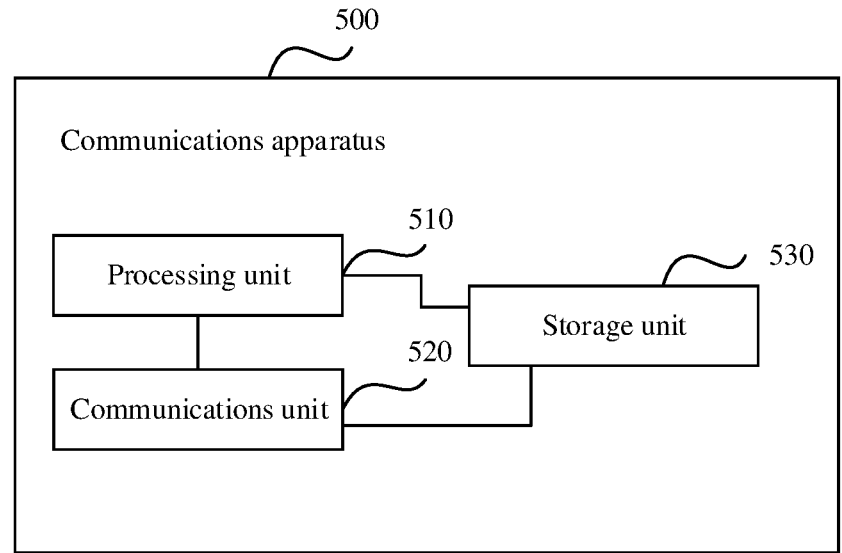
FIG. 5 is a schematic diagram of an apparatus according to an embodiment of this application.
Figure 6:
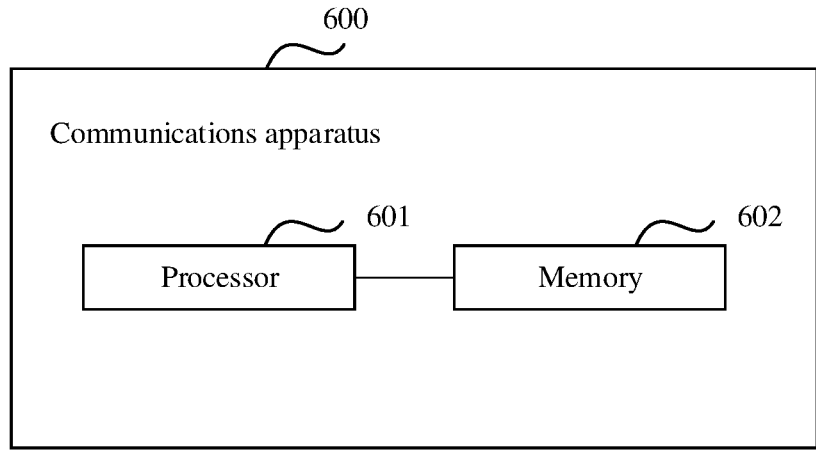
FIG. 6 is a schematic diagram of an apparatus according to another embodiment of this application.
Figure 7:
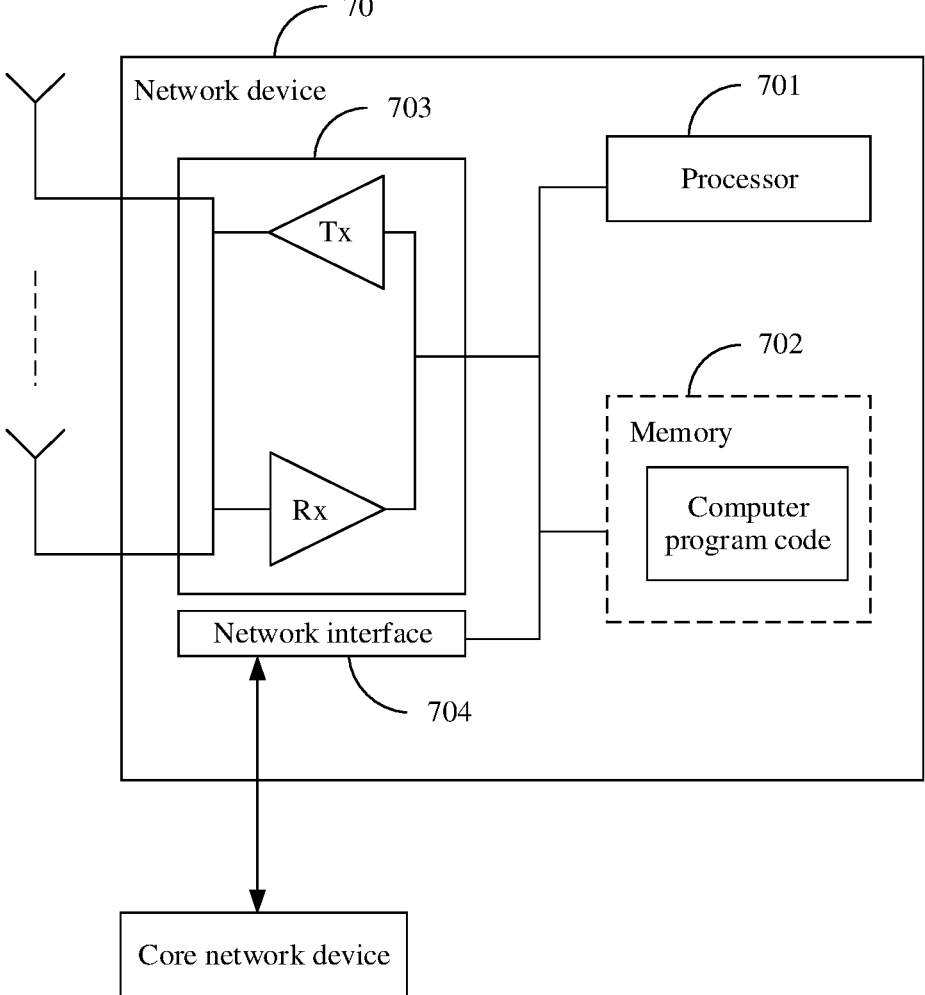
FIG. 7 is a schematic diagram of a network device according to an embodiment of this application.

The following describes in detail the apparatus provided in the embodiments of this application with reference to FIG. 5 to FIG. 7. It should be understood that descriptions of apparatus embodiments are corresponding to the descriptions of the method embodiments. Therefore, for content that is not described in detail, refer to the method embodiments. For brevity, a part of content is not described herein again.

FIG. 5 is a schematic structural diagram of a communications apparatus 500 according to an embodiment of this application. The communications apparatus 500 may implement any function of the first network device or the second network device in the method embodiments. The communications apparatus may be a network device (the first network device or the second network device), or may be a component (for example, a chip or a circuit) that may be configured in a network device. The communications apparatus 500 includes at least one processing unit 510 (that one processing unit is included is used as an example for description in FIG. 5) and at least one communications unit 520 (that one communications unit is included is used as an example for description in FIG. 5). Optionally, the communications apparatus 500 may further include at least one storage unit 530 (that one storage unit is included is used as an example for description in FIG. 5). The storage unit 530 may be configured to store a computer-executable instruction, and/or other information, such as data. The processing unit 510 may read an instruction or data stored in the storage unit 530, to implement a corresponding solution.

It should be noted that the communications unit in the embodiments of this application may also be referred to as a transceiver unit (module) or a communications interface, and the processing unit may be referred to as a processing module.

For example, when the communications apparatus implements a function or a step corresponding to the first network device in the method embodiments:

The processing unit 510 may be configured to determine a reference synchronization signal block in at least one synchronization signal block. For a manner of determining the reference synchronization signal block by the processing unit 510, refer to the descriptions in the foregoing method embodiments.

Further, the processing unit 510 may be further configured to determine configuration information of at least one first reference signal based on timing information of the reference SSB.

The communications unit 520 is configured to send, to a second network device, the configuration information corresponding to the at least one first reference signal and configuration information corresponding to the at least one synchronization signal block.

In some possible implementations, the communications unit 520 may be further configured to send first indication information or second indication information to the second network device, where the first indication information or the second indication information is used to determine the reference synchronization signal block. For the first indication information and the second indication information, refer to related descriptions in the foregoing method embodiments. In some possible implementations, the communications unit 520 may be further configured to send, to the second network device, information about an SSB index, to indicate to determine timing information of a CSI-RS by using a timing of an SSB corresponding to the SSB index as a reference, where the SSB corresponding to the SSB index is used as the reference SSB.

For example, when the communications apparatus implements a function or a step corresponding to the second network device in the method embodiments:

The communications unit 520 may be configured to receive, from a first network device, configuration information corresponding to at least one first reference signal and configuration information corresponding to at least one synchronization signal block.

The processing unit 510 may be configured to determine timing information of the at least one first reference signal based on timing information of a reference synchronization signal block, where the reference synchronization signal block belongs to the at least one synchronization signal block.

In some possible implementations, the processing unit 510 may be configured to determine, as the reference synchronization signal block, a synchronization signal block corresponding to a fixed frequency or a synchronization signal block that is in the at least one synchronization signal block and that is corresponding to a fixed sequence number.

In some possible implementations, the communications unit 520 may be further configured to receive first indication information or second indication information from the first network device, where the first indication information or the second indication information is used to determine the reference synchronization signal block. For the first indication information and the second indication information, refer to related descriptions in the foregoing method embodiments.

In some possible implementations, the processing unit 510 may be further configured to: when the communications apparatus 500 receives configuration information of SSBs corresponding to a plurality of frequencies, consider, by default based on a specification, that the plurality of SSBs are synchronized, and determine, as the reference SSB, any SSB or a synchronization signal block corresponding to a fixed frequency or a fixed sequence number.

In some possible implementations, the communications unit 520 may be further configured to receive, from the first network device, information about an SSB index, so that timing information of a CSI-RS is determined by using a timing of an SSB corresponding to the SSB index as a reference, where the SSB corresponding to the SSB index is used as the reference SSB.

It may be understood that the foregoing units may be separately disposed or may be integrated. This is not limited in this embodiment of this application.

In a possible design, the processing unit 510 may be a processor, and the communications unit 520 may be a transceiver, or the communications unit 520 may be a communications interface or another interface circuit. The storage unit 530 may be a memory.

The "module" or the "unit" in the embodiments of this application may be an application-specific integrated circuit ASIC, a circuit, a processor and a memory that executes one or more software or firmware programs, an integrated logic circuit, and/or another component that can provide the foregoing functions.

FIG. 6 shows a communications apparatus 600 according to another embodiment of this application. The communications apparatus 600 may implement any function of the first network device or the second network device in the method embodiments. The communications apparatus may be a network device (the first network device or the second network device), or may be a component (for example, a chip or a circuit) that may be configured in a network device. The communications apparatus 600 includes at least one processor 601 (that one processor is included is used as an example for description in FIG. 6) and at least one memory 602 (that one memory is included is used as an example for description in FIG. 6). The memory may store an instruction (or may also be referred to as a program or code) and/or data. The processor 601 is coupled to the memory 602. For example, the processor 601 may invoke the instruction and/or the data in the memory 602, so that the communications apparatus implements any function corresponding to the first network device or the second network device in the foregoing method embodiments.

FIG. 7 is a schematic structural diagram of a network device (for example, the first network device or the second network device) according to an embodiment of this application.

The network device 70 includes at least one processor (that one processor 701 is included is used as an example for description in FIG. 7), at least one transceiver (that one transceiver 703 is included is used as an example for description in FIG. 7), and at least one network interface (that one network interface 704 is included is used as an example for description in FIG. 7). Optionally, the network device 70 may further include at least one memory (that one memory 702 is included is used as an example for description in FIG. 7). The processor 701, the memory 702, the transceiver 703, and the network interface 704 may be connected through a communications line. The network interface 704 is configured to connect to a core network device through a link (for example, an NG interface), or connect to a network interface of another network device through a wired or wireless link (for example, an Xn interface) (not shown in FIG. 7). This is not specifically limited in this embodiment of this application.

The processor and the transceiver described in the embodiments of this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs). Optionally, the processor may include one or more processors, for example, include one or more CPUs. When the processor is one CPU, the CPU may be a single-core CPU or a multi-core CPU. The transceiver is configured to: send data and/or a signal, and receive data and/or a signal. The transceiver may include a transmitter and a receiver. The transmitter is configured to send data and/or a signal, and the receiver is configured to receive data and/or a signal. The transceiver may also be a communications interface. The memory includes but is not limited to a random access memory (RAM), a read-only memory (ROM), an erasable programmable read-only memory (EPROM), and a compact disc read-only memory (CD-ROM). The memory is configured to store a related instruction and/or data.

In a possible design, the chip mentioned in the embodiments of this application may implement a related function that can be implemented by the processor, or may implement a related function that can be implemented by the processor and the transceiver, or may implement a related function that can be implemented by the processor, the transceiver, and the memory. The chip may be a field programmable gate array, a dedicated integrated chip, a system chip, a central processing unit, a digital signal processing circuit, or a microcontroller for implementing a related function, or may be a programmable controller or another integrated chip.

An embodiment of this application further provides a computer-readable medium. The computer-readable medium stores a computer program. When the computer program is executed, the communication method in any one of the foregoing method embodiments is implemented.

An embodiment of this application further provides a computer program product. When the computer program product is executed, the communication method in any one of the foregoing method embodiments is implemented.

This application further provides a communications system. The communications system may include the communications apparatus or device shown in any one of FIG. 5 to FIG. 7. Optionally, the communications system may further include a terminal device, and the terminal device communicates with the communications apparatus or device shown in any one of FIG. 5 to FIG. 7.

A person of ordinary skill in the art may be aware that, in combination with units and algorithm steps of the examples described in the embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a second network device from a first network device, configuration information corresponding to at least one first reference signal and configuration information corresponding to at least one synchronization signal block, wherein the at least one synchronization signal block corresponds to a synchronization signal block frequency;
receiving, by the second network device, first indication information from the first network device, wherein the first indication information indicates frequency information corresponding to a reference synchronization signal block, and the reference synchronization signal block is a basis for determining timing information of the at least one first reference signal; and
determining, by the second network device, timing information of the at least one first reference signal based on timing information of the reference synchronization signal block, wherein the reference synchronization signal block is comprised in the at least one synchronization signal block,
wherein the first network device and the second network device are network-side devices, and are each configured to communicate with at least one terminal device.

2. The method according to claim 1, wherein:
the reference synchronization signal block corresponds to a fixed frequency; or
the reference synchronization signal block corresponds to a fixed sequence number.

3. The method according to claim 1, further comprising:
receiving second indication information from the first network device, wherein the second indication information is used to determine a synchronization status of each synchronization signal block of the at least one synchronization signal block.

4. The method according to claim 3, wherein when it is determined, based on the second indication information, that all synchronization signal blocks of the at least one synchronization signal block are synchronized, the reference synchronization signal block is any one synchronization signal block of the at least one synchronization signal block.

5. The method according to claim 3, wherein when it is determined, based on the second indication information, that not all synchronization signal blocks of the at least one synchronization signal block are synchronized, the reference synchronization signal block is a synchronization signal block corresponding to a fixed frequency or a synchronization signal block that is in the at least one synchronization signal block and that corresponds to a fixed sequence number.

6. The method according to claim 1, wherein the at least one first reference signal comprises a channel state information-reference signal.

7. The method according to claim 1, wherein the configuration information corresponding to the at least one synchronization signal block comprises at least one of the following: frequency information (carrierFreq) of the synchronization signal block, a subcarrier spacing (ssbSubcarrierSpacing) of the synchronization signal block, a measurement timing configuration (ssb-MeasurementTimingConfiguration) of the synchronization signal block, or a physical cell identifier corresponding to the synchronization signal block.

8. A method, comprising:

determining, by a first network device, a reference synchronization signal block in at least one synchronization signal block, wherein the at least one synchronization signal block corresponds to a synchronization signal block frequency;

sending, by the first network device to a second network device, configuration information corresponding to at least one first reference signal and configuration information corresponding to the at least one synchronization signal block, wherein the configuration information corresponding to the at least one first reference signal is determined based on a timing of the reference synchronization signal block; and sending, by the first network device, first indication information to the second network device, wherein the first indication information indicates frequency information corresponding to the reference synchronization signal block, and the reference synchronization signal block is a basis for determining timing information of the at least one first reference signal, wherein the first network device and the second network device are network-side devices, and are each configured to communicate with at least one terminal device.

9. The method according to claim 8, wherein:

the reference synchronization signal block corresponds to a fixed frequency; or the reference synchronization signal block corresponds to a fixed sequence number.

10. The method according to claim 8, further comprising:

sending, by the first network device, second indication information to the second network device, wherein the second indication information is used to determine a synchronization status of each synchronization signal block of the at least one synchronization signal block.

11. The method according to claim 8, wherein the configuration information corresponding to the at least one synchronization signal block comprises at least one of the following: frequency information (carrierFreq) of the synchronization signal block, a subcarrier spacing (ssbSubcarrierSpacing) of the synchronization signal block, a measurement timing configuration (ssb-MeasurementTimingConfiguration) of the synchronization signal block, or a physical cell identifier corresponding to the synchronization signal block.

12. A system, comprising:

a second network device; and a first network device, configured to:

determine a reference synchronization signal block in at least one synchronization signal block, wherein the at least one synchronization signal block corresponds to a synchronization signal block frequency;

send, to the second network device, configuration information corresponding to at least one first reference signal and configuration information corresponding to the at least one synchronization signal block, wherein the configuration information corresponding to the at least one first reference signal is determined based on a timing of the reference synchronization signal block; and send first indication information to the second network device, wherein the first indication information indicates frequency information corresponding to the reference synchronization signal block, and the reference synchronization signal block is a basis for determining timing information of the at least one first reference signal, wherein the first network device and the second network device are network-side devices, and are each configured to communicate with at least one terminal device.

13. The system according to claim 12, wherein the second network device is configured to:

receive, from the first network device, the configuration information corresponding to the at least one first reference signal and the configuration information corresponding to the at least one synchronization signal block; and determine timing information of the at least one first reference signal based on timing information of the reference synchronization signal block.

14. The system according to claim 13, wherein the second network device is further configured to:

receive the first indication information from the first network device.

15. The system according to claim 12, wherein the reference synchronization signal block corresponds to a fixed frequency or a fixed sequence number.

16. The system according to claim 12, wherein the first reference signal comprises a channel state information-reference signal.

17. The system according to claim 12, wherein the first network device is further configured to send second indication information to the second network device, wherein the second indication information is used to determine a synchronization status of each synchronization signal block of the at least one synchronization signal block.

18. The system according to claim 17, wherein when it is determined, based on the second indication information, that all synchronization signal blocks of the at least one synchronization signal block are synchronized, the reference synchronization signal block is any one synchronization signal block of the at least one synchronization signal block.

19. The system according to claim 17, wherein when it is determined, based on the second indication information, that not all synchronization signal blocks of the at least one synchronization signal block are synchronized, the reference synchronization signal block is a synchronization signal block corresponding to a fixed frequency or a synchronization signal block that is in the at least one synchronization signal block and that corresponds to a fixed sequence number.

20. The system according to claim 12, wherein the configuration information corresponding to the at least one synchronization signal block comprises at least one of the following: frequency information (carrierFreq) of the synchronization signal block, a subcarrier spacing (ssbSubcarrierSpacing) of the synchronization signal block, a measurement timing configuration (ssb-MeasurementTimingConfiguration) of the synchronization signal block, or a physical cell identifier corresponding to the synchronization signal block.

* * * * *